United States Patent [19]
Kappeler

[11] Patent Number: 5,416,316
[45] Date of Patent: May 16, 1995

[54] OPTICAL SENSOR ARRANGEMENT FOR PRESENCE DETECTION WITH VARIABLE PULSE REPETITION FREQUENCY

[75] Inventor: Otmar Kappeler, Denzlingen, Germany

[73] Assignee: Erwin Sick GmbH Optik-Electronik, Waldkirch, Germany

[21] Appl. No.: 179,298

[22] Filed: Jan. 10, 1994

Related U.S. Application Data

[62] Division of Ser. No. 990,615, Dec. 14, 1992, abandoned.

[51] Int. Cl.$^6$ .............................................. G01V 9/04
[52] U.S. Cl. .................................. 250/221; 250/222.1; 340/556
[58] Field of Search ................. 250/214 B, 221, 222.1, 250/214 R, 223 R; 307/311; 340/555, 556, 557

[56] References Cited

U.S. PATENT DOCUMENTS

| | | | |
|---|---|---|---|
| 4,381,446 | 4/1983 | Fukuyama et al. | 250/214 R |
| 4,434,363 | 2/1984 | Yorifuji et al. | 340/556 |
| 4,973,837 | 11/1990 | Bradbeer | 250/221 |
| 5,164,714 | 11/1992 | Wehrer | 250/221 |

FOREIGN PATENT DOCUMENTS

| | | |
|---|---|---|
| 0345361A1 | of 0000 | European Pat. Off. . |
| 2256930B2 | of 0000 | Germany . |
| 2539438B2 | of 0000 | Germany . |
| 3119876A1 | of 0000 | Germany . |
| 3123758A1 | of 0000 | Germany . |
| 4101206A1 | of 0000 | Germany . |
| 3125728C2 | 4/1986 | Germany . |
| 4031142A1 | 4/1992 | Germany . |

*Primary Examiner*—David C. Nelms
*Attorney, Agent, or Firm*—Townsend and Townsend Khourie and Crew

[57] ABSTRACT

The invention relates to a method of operating an optical sensor arrangement for detecting articles present in a monitored region by means of a light transmitter and a light receiver. The light transmitter emits light signals which respectively comprise a number of pulses which follow each other at a determined pulse repetition frequency.

19 Claims, 3 Drawing Sheets

OPTICAL SENSOR ARRANGEMENT FOR PRESENCE DETECTION WITH VARIABLE PULSE REPETITION FREQUENCY

This application is a division of Ser. No. 07/990,615, filed Dec. 14, 1992, now abandoned.

The invention relates to a method of operating an optical sensor arrangement for determining the presence of articles in a monitored region, comprising a light transmitter which emits light signals one after the other with a time delay into the monitored region, and a light receiver connected to a received signal processing unit which issues an article detection signal in dependence on the presence of an article in the monitored region.

Optical sensor arrangements can be realized as light barriers in the broadest sense, i.e. that reflection light barriers, light detectors, distance detectors, visual range measuring apparatus, etc. are included within this expression.

Optical sensor arrangements, in particular light barriers for the recognition of articles generally operate in accordance with a principle in which a light signal in the form of an individual pulse is periodically emitted for a short duration and the light reflected by the article is received by the light receiver and evaluated in a received signal processing unit. Each emitted signal is followed by a comparatively long pause which can correspond to about 10 to 100 times the length of the emitted signal.

It is however a problem in the described optical sensor arrangements that disturbing signals which are variable with respect to the time, in particular also periodical disturbing signals, can entail a falsification of the evaluation result when they occur precisely during the emission of the light signal and arrive into the received signal processing unit via the optical or electromagnetic stage. Disturbing signals can be both optical disturbing signals as well as electromagnetic disturbances which are induced into the electronic part of the sensor arrangement following the opto-electronic conversion in the light receiver.

For this reason attempts have already been made to attenuate the influence of disturbing signals by means of filters following the light receiver, which do not transmit any received signal as article detection signal. These measures have however the drawback that only a light received value averaged over a given period is evaluated. The actual frequency at which the article determination signals can be outputted is thereby reduced in a non desired manner.

Further attempts have been made to reproduce the cause of the disturbing signal during the emission of the light signal by determining the evolution of the disturbing signal before and/or after the emission of a light signal, and with the help of this information, to eliminate the disturbing signal from the received light signal. In a method of this kind it can occur that the disturbing signal has not a sufficient regularity, such that a reproduction is largely impossible, whereby it is no longer ensured to carry out the method without errors.

In particular, the operating mode of the known method can be affected when disturbing signals having a certain regularity occur, whereby important disturbances can arise for example on repeated coincidence of pulse-shaped emission signal and disturbing signal. Disturbing signals having a higher frequency can also in particular strongly affect the operating mode of the known method.

The object underlying the invention is to realize a method of the kind mentioned at the beginning, which is largely unaffected by disturbances and allows an ideal elimination of disturbances, in particular also with disturbing signals which occur regularly.

According to the invention, this object is met in that each individual emitted light signal comprises a certain number of pulses which follow each other at a pulse repetition frequency; and in that the received light signals pass through a filter arrangement in the received signal processing unit, this filter arrangement being permeable for spectral portions of the pulse repetition frequency.

Thus the invention uses as light signal a pulse train instead of the previously usual individual pulse. The received pulse train passes thereafter through a filter arrangement which is permeable for spectral portions of the pulse repetition frequency, whereby the disturbing signal portions out of the pulse repetition frequency are eliminated.

An advantage of this method is to be seen in that the emission and received signals have a significantly narrower bandwidth than for example individual pulses, whereby on the one hand the received signals after a preceding narrow-band filtering are easier to process and on the other hand a greater proportion of disturbing signal can be eliminated by the filter arrangement since all disturbing signals lying outside the narrow bandwidth of the emitted/received signals are filtered out by the filter arrangement and therefore do not arrive to the further processing.

An eventual disturbance of the operating mode of the method of the invention by disturbing signals which lie exactly in the region of the pulse repetition frequency can be excluded by the advantageous variants described hereafter of the method of the invention.

a) The pulse repetition frequency of the individual successive light signals is modified after each light signal emission. Since it can be excluded that the frequency of the disturbing signal varies exactly in the same manner as the pulse repetition frequency, the above described disturbances can be efficiently eliminated by means of this method.

b) The modification of the pulse repetition frequency according to a) is only carried out when a disturbing signal is detected in the pauses between the light signal emissions, in particular a disturbing signal having the frequency of the last emitted light signal.

c) The pulse repetition frequency of the pulses in succession within a light signal is not held constant, but increased or reduced, in particular continuously. Owing to this "wobbling-through" of the individual light signals a periodical disturbance can at most have an effect in a very small region of an individual light signal, whereby however a received light signal can be only minimally falsified, such that no error occurs in this case.

d) During the detection of a disturbing signal after emission of a light signal, the emission of the following light signal is delayed until the amplitude of the detected disturbing signal has fallen to below a predetermined threshold.

e) A disturbing signal possibly present before and/or after emission of a light signal is received by the light receiver and the information gained thereby is used for the approximate determination of the evolution of the disturbing signal during the emission of the light signal and for extracting the useful signal from the entire light signal received, composed of the useful signal and the disturbing signal.

In all described methods it is additionally possible to carry out test receptions between the emission of light signals in order to determine disturbing signals. In this case, light signals are emitted for example only when the disturbing signal level determined during the test receptions is sufficiently low. Furthermore, it is also possible to use a received signal for the evaluation only when a sufficiently low disturbing signal level is determined following the reception.

A particularly advantageous apparatus for carrying out the method of the invention comprises a multiplier as filter arrangement, at the first input of which is applied the filtered received signal, in particular by means of a high-pass filter, and at the second input of which is applied a further signal whose basic frequency coincides with the respective pulse repetition frequency of the emitted light signal. In this case it is also possible to connect a pre-amplifier between the high-pass filter and the multiplier.

The use of a multiplier as filter arrangement provides substantial advantages:

In this manner the filter arrangement can be realized very simply in a monolithic form.

The mean frequency of this band-pass filter realized as a multiplier can be modified in a very simple manner by modifying the basic frequency of the further signal applied to the second input of the multiplier, which is advantageous in particular when using the method in accordance with the above points a), b) and c), since in this case the basic frequency of the further signal must vary synchronously with the pulse repetition frequency of the emitted light signals.

A band-pass filter realized as multiplier can be reset without difficulties to a defined energy condition, without having to take into account post-pulse oscillations as for example with ceramic band filters.

Since the two signals to be multiplied have each the same frequency, but the amplitude of the received light signal varies as a function of the presence of an article in the monitored region, a signal arises at the output of the multiplier, this signal comprising frequency components having the double pulse repetition frequency and a DC signal component. The amplitude of the DC component represents the presence of an article in the monitored region. This signal component can be filtered out and evaluated in an extremely simple manner by means of a low-pass filter connected after the multiplier.

In advantageous embodiments of the described apparatus the pulses of the light signal as well as the pulses of the other signal can have a sinusoidal shape or a rectangular shape.

Preferably, a demodulator is connected after the above mentioned low-pass filter, which can be realized for example as an integrator. This integrator can be short-circuited during the periods during which no light signal is emitted in order to avoid in this manner that disturbing signals which occur between the light signal emissions would influence the delivery of an article detection signal.

It is further advantageous that the demodulation of the output signal of the low-pass filter, effected for example by means of the integrator, must be delayed as long a time as to compensate for the signal transit time of the low-pass filter.

In order to compensate for possible transit time differences between the received light signal and the other signal to be mixed by multiplication with this signal, it is possible to provide a first and a second multiplier, and at each time the first input of both multipliers receives the received signal, whereas the other signal is applied at the second input of the first multiplier and the other signal is applied with 90° phase shift at the second input of the second multiplier. The output signals of both multipliers are then respectively low-pass filtered and thereafter added. In this manner, the effects of the above mentioned transit time differences are eliminated.

The invention will be described thereafter in connection with the exemplary embodiments shown in the figures: the latter show:

FIG. 1 a block diagram of an advantageous embodiment of an apparatus for carrying out the method of the invention, FIG. 2 possible timely evolutions of the signals indicated in FIG. 1, and FIGS. 3a–3c advantageous light signal forms for carrying out the method of the invention.

FIG. 1 shows an oscillator 2, which generates for example a sinusoidal shaped fundamental oscillation, which is optionally supplied via a signal former 3 as signal A to a pulse repetition generator 4. The pulse repetition generator 4 is connected to a control unit 1 to which the signal produced by the oscillator 2 is supplied. The control unit generates a control signal B which indicates to the pulse repetition generator 4 in which time intervals a pulse train must be respectively generated.

The pulse trains C generated by the pulse train generator 4 are supplied to a light transmitter 5 which emits a light signal 6 in correspondence with the signal C.

The light signal 6 is reflected by an article 7 for example when such an article is present in the monitored region, and supplied as light received signal 8 to a light receiver 9 where it is again transformed into an electrical signal.

The received signal can then optionally be led to a high-pass filter 10 which filters out low frequency disturbing signals and thereby reduces the signal dynamics to be processed in the case of larger low frequency disturbing components.

The signal filtered for example in this manner can then be led to an optional preamplifier 11 from where it arrives at a first input of a multiplier 12.

The second input of the multiplier 12 is supplied with the output signal of the oscillator 2.

For the case where the signal former 3 generates rectangular signals the multiplier 12 can be designed as simple analog circuitry. However, in the case where the signal A has a sinusoidal shape the multiplier 12 is designed as analog multiplier.

In the multiplier 12 is generated a signal which includes signal components of the sum frequency and the difference frequency of the two signals applied to its inputs. Since the two signals have the same frequency and the received signal differs only by its amplitude from the other signal supplied to the second input of the multiplier in dependence on the presence of an article in the monitored region, the difference frequency component of the output signal of the multiplier 12 is a DC signal whose amplitude provides an indication about the presence of an article in the monitored region. In order to filter out this DC component from the output signal of the multiplier 12 a low-pass filter 13 is connected after the latter.

The output signal of the low-pass filter 13 is supplied via an optional amplifier 14 for example to a switch 15, which is optionally controlled. A signal D is applied to the switch 15 by the control unit 1 in such a manner that the switch is opened during the pauses between the light signal emissions and closed during the light signal emission, such that the received signal arrives to the output of the switch 15 only during the light signal emission.

The output signal of the switch 15 is applied to a demodulator 16, which can be realized for example as integrator. The control unit 1 also applies the signal D to the integrator 16 in such a manner that it is set to zero during the pauses between light signal emissions. In this manner, disturbing signals occurring between the light signal emissions are eliminated.

At the end of the measurement period the output signal E at the output of the integrator 16 has a value which provides the desired information about the presence of an article in the monitored region and can be used for the further signal evaluation.

In accordance with reflection sensing principles, the described arrangement can also be designed in a dual stage manner.

FIG. 2 shows possible evolutions of the signals A to E versus time.

The oscillator 2 generates a periodical rectangular signal A.

The control unit 2 delivers a signal B which has a high level during those time intervals during which a light signal emission must be effected, and a low level during the pauses between the light signal emissions.

Signal C shows the pulse train generated by the pulse train generator 4, which can be obtained for example by multiplying the signals A and B.

Signal B represents that signal of the control unit 1 which effects the control of the switch 15 or of the demodulator 16 respectively. The signal D triggers a reset of the integrator 16 after each pulse train emission.

The three illustrated time intervals of the signal E represent a possible output signal evolution of the sensor arrangement on the presence of an article in the monitored region during the first time interval.

Figure 1:
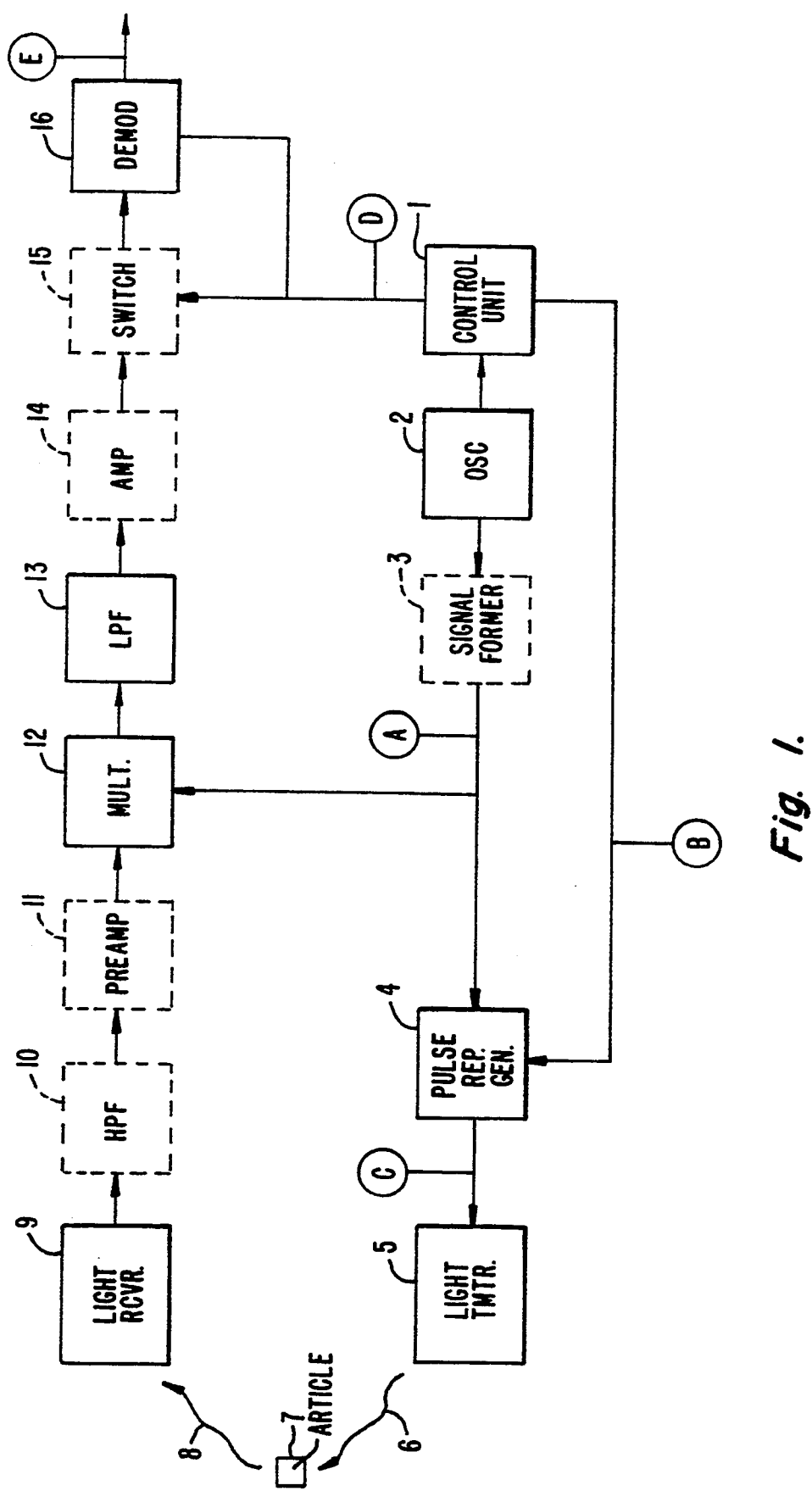
Figure 2:
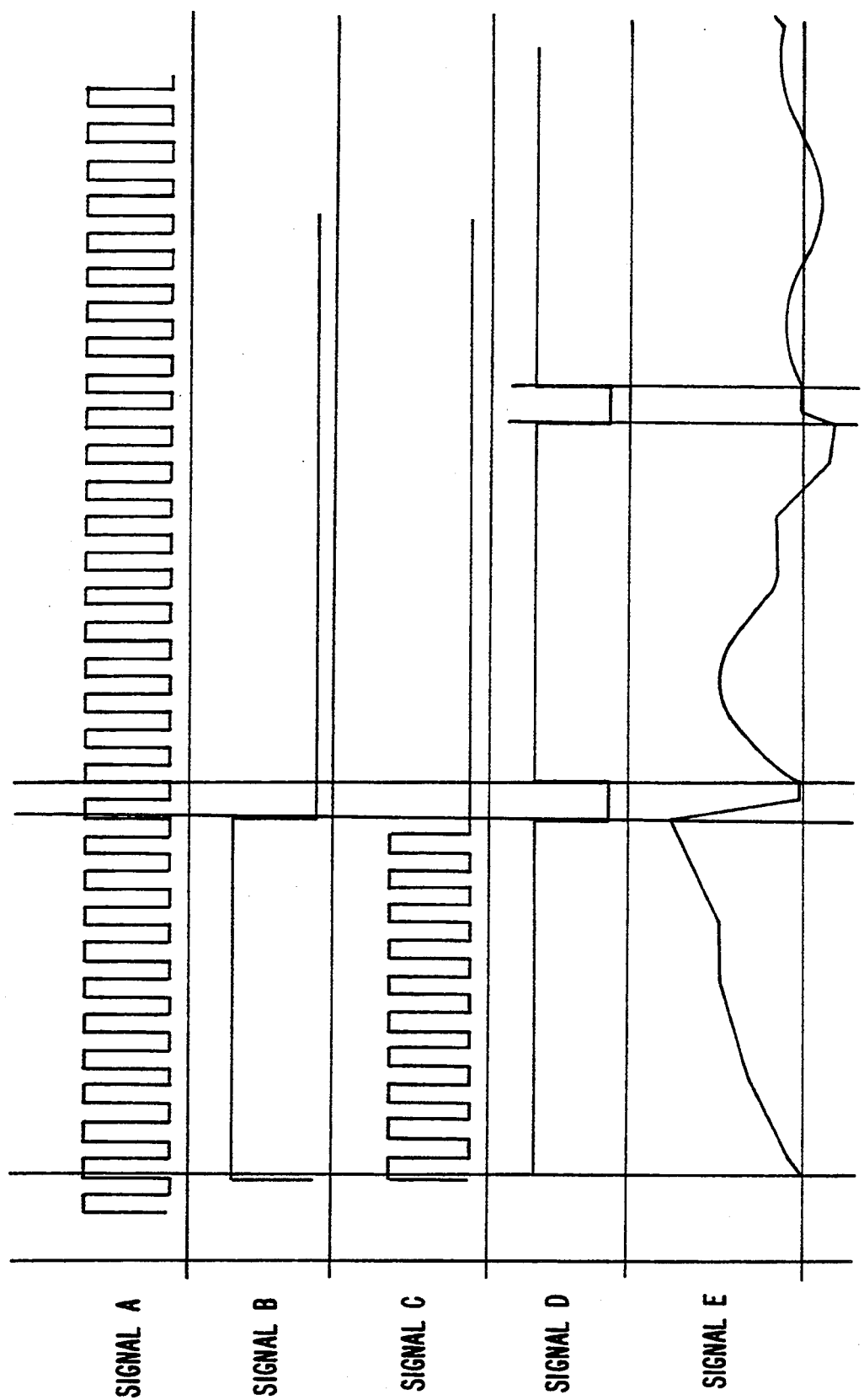
Figure 3A:
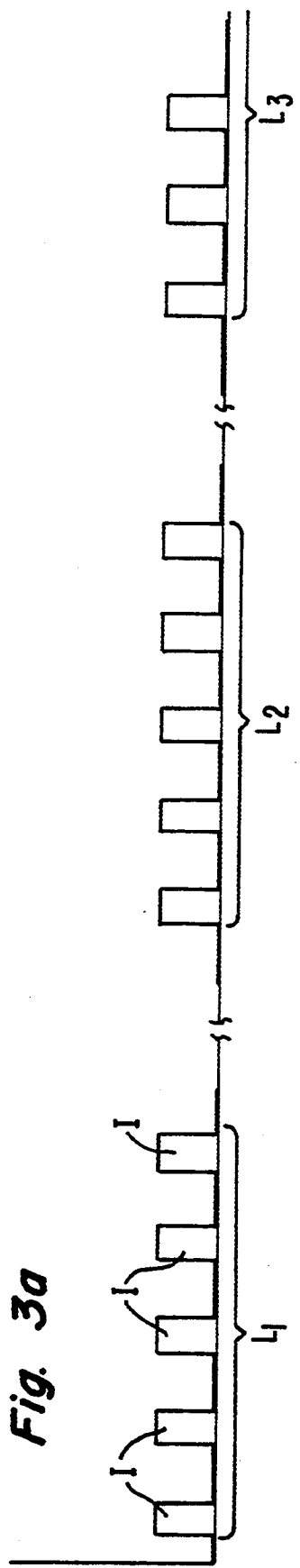
FIG. 3a shows a light signal $L_1$, in which the pulses I follow each other with a constant pulse repetition frequency. The pulse repetition frequency of all light signals $L_2, L_3, \ldots$ following the light signal $L_1$ is in this case constant.
Figure 3B:
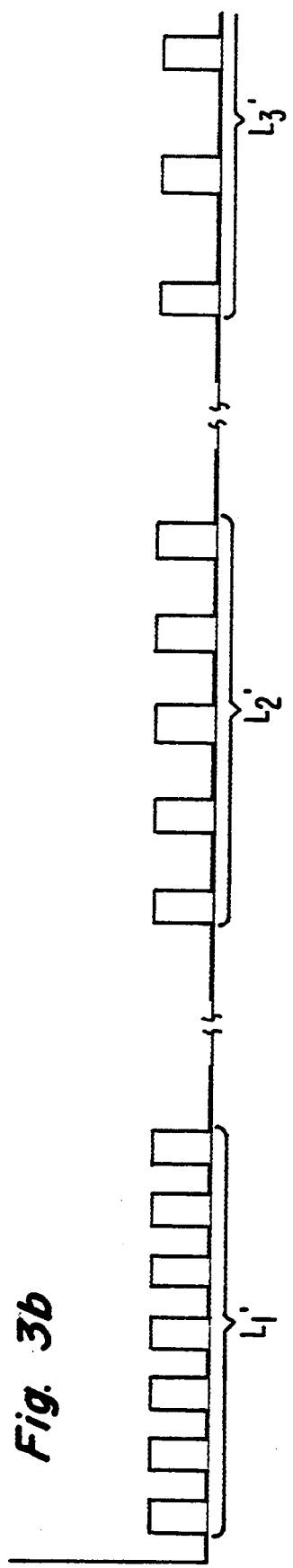
FIG. 3 shows possible forms of the light signals emitted one after the other, which, in accordance with the invention, consist of pulse trains.

FIG. 3b shows a light signal $L_1'$ in which the pulse repetition frequency, at which the pulses follow each other in this light signal is also constant. However, in this example, the pulse repetition frequency of the successive light signals $L_1', L_2', L_3', \ldots$ continuously decreases, and the pulse repetition frequency of a n-th light signal $L_n'$ is again equal to the pulse repetition frequency of the light signal $L_1'$, whereupon the pulse repetition frequency of the light signals following the light signal $L_n'$ is again continuously increased.

The described variation of the pulse repetition frequency of the light signals can be effected either after each light signal emission, or only when a disturbing signal is present in the region of the pulse repetition frequency.

It is also possible to increase the pulse repetition frequency in a non-continuous manner, but to decrease it in a continuous manner. A discontinuous variation of the pulse repetition frequency is also possible.

Figure 3C:
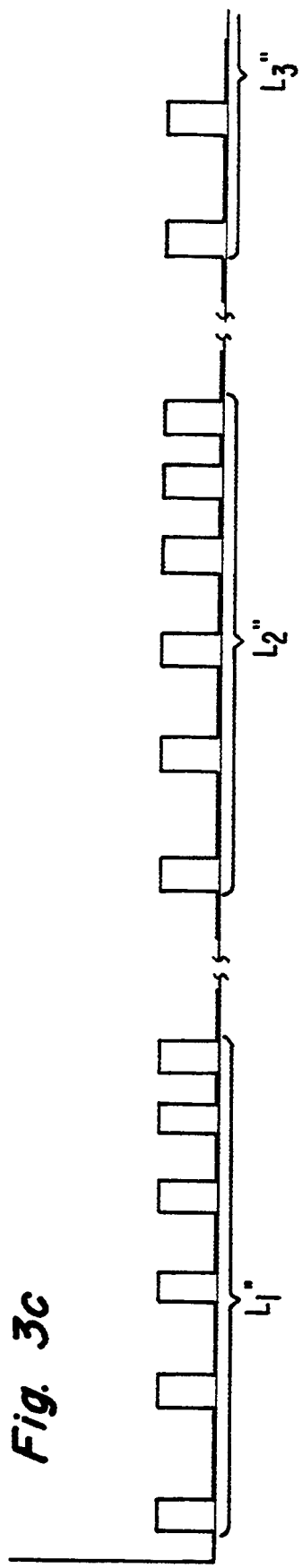

FIG. 3c shows light signals $L_1'', L_2'', L_3''$, in which the pulse repetition frequency of the pulses in succession within a light signal is continuously increased. Also in this case a decrease is also possible as a variant.

The light signals in FIG. 3 are merely schematically represented since they have in practice a significantly higher number of pulses.

I claim:

1. The method of operating an optical sensor arrangement for detecting articles present in a monitored region, said method comprising the steps of:

emitting a plurality of light signals from a light transmitter into said monitored region, each of said light signals comprising a number of pulses, forming a pulse sequence, which follow each other at a pulse repetition frequency;

varying said pulse repetition frequency between any two successive emitted light signals;

receiving said light signals at a light receiver as received light signals;

processing said received light signals in a received signal processing stage, said received signal processing stage comprising a filter arrangement permeable to frequency components of the pulse sequence;

producing an article detection signal when said received light signals indicates the presence of an article in said monitored region.

2. The method of operating an optical sensor arrangement of claim 1, further comprising:

testing for receipt of disturbing signals induced by disturbing light signals and electromagnetic signals unrelated to said light signals unrelated to said light signals emitted from said light transmitter, and producing disturbing signal information.

3. The method of operating an optical sensor arrangement of claim 2, wherein said testing step is further limited as follows:

testing for receipt of disturbing signals and producing disturbing signal information, until said disturbing signals have a sufficiently low magnitude.

4. The method of operating an optical sensor arrangement of claim 2, wherein said producing step is further limited as follows:

producing an article detection signal when said received light signal indicates the presence of an article in said monitored region, only when said disturbing signals are sufficiently low.

5. The method of operating an optical sensor arrangement of claim 2, further comprising:

from said disturbing signal information approximating the evolution of said disturbing signal during the emission of light signals and extracting a useful signal from the received total light signal composed of said useful signal and said disturbing signal.

6. An apparatus for detecting articles present in a monitored region, said apparatus comprising:

an oscillator, generating an oscillation signal;

a pulse repetition generator, receiving as input said oscillation signal for producing groups of pulses which follow each other at a pulse repetition frequency and for varying the pulse repetition frequency from one group of pulses to a next group of pulses;

a light transmitter, receiving as input said pulses and emitting light signals comprising a group of light pulses generated in response to input pulses, with said pulse repetition frequency varying from one light signal to the next light signal;

a light receiver, receiving as input said light signals and producing electrical signals; and a filter arrangement, receiving as inputs said electrical signals and said oscillation signal, and generating an output indicating the detection of articles in said monitored region;

wherein:

the fundamental frequency of said oscillation signal equals said pulse repetition frequency of said emitted light signals; and said filter arrangement is permeable to frequency components of pulse sequences.

7. The apparatus of claim 6, wherein:
said filter arrangement comprises:
a high-pass filter receiving as input said electrical signals and generating a high-pass filter output signal; and
a multiplier, receiving as inputs said high-pass filter output signal and said oscillation signal, and producing a multiplier output.

8. The apparatus of claim 6, wherein:
said filter arrangement comprises:
a high-pass filter, receiving as input said electrical signals and generating a high-pass filter output signal;
a preamplifier, receiving as input said high-pass filter output signal and producing a preamplified output signal; and
a multiplier, receiving as inputs said preamplified output signal and said oscillation signal, and producing a multiplier output.

9. The apparatus of claim 6, wherein:
said oscillator generates an oscillation signal which is sinusoidal.

10. The apparatus of claim 6, wherein:
said oscillator generates an oscillation signal which is rectangular.

11. The apparatus of claim 6, wherein:
said pulse repetition generator produces pulses which are sinusoidal.

12. The apparatus of claim 6, wherein:
said pulse repetition generator produces pulses which are rectangular.

13. The apparatus of claim 6, wherein:
said filter arrangement comprises:
a high-pass filter, receiving as input said electrical signals and generating a high-pass filter output signal;
a multiplier, receiving as inputs both said high-pass filter output signal and an oscillation signal, and producing a multiplier output; and
a low-pass filter, receiving as input said multiplier output and producing a low-pass filter output.

14. The apparatus of claim 13, wherein said filter arrangement further comprises:
a demodulator, receiving as input said low-pass filter output signal and generating a demodulated output signal.

15. The apparatus of claim 14, wherein said demodulator further comprises:
a delay circuit, receiving as input said low-pass filter output signal and producing a delayed output signal, for delaying the demodulation of said low-pass filter output signal for a time sufficient to compensate for the transit of said multiplier output through said low-pass filter.

16. The apparatus of claim 14, wherein:
said demodulator comprises an integrator.

17. The apparatus of claim 16, wherein:
said demodulator comprises an integrator where said integrator short-circuits when no light signal is emitted.

18. The apparatus of claim 6, further comprising:
a first multiplier, receiving as input said electrical signals and said oscillation signal, and producing a first multiplier output signal; and
a second multiplier, receiving as input said electrical signals and said oscillation signal with a 90° phase shift, and producing a second multiplier output signal.

19. The apparatus of claim 18, further comprising:
a first low-pass filter, receiving as input said first multiplier output signal and producing a first low-pass filter output signal;
a second low-pass filter, receiving as input said second multiplier output signal and producing a second low-pass filter output signal; and
an adder, receiving as input said first low-pass filter output signal and said second low-pass filter output signal and producing an adder output signal.

* * * * *